United States Patent [19]

Lewis, Jr.

[11] Patent Number: 4,463,371
[45] Date of Patent: Jul. 31, 1984

[54] CLOCK GENERATION APPARATUS FOR A DIGITAL TELEVISION SYSTEM

[75] Inventor: Henry G. Lewis, Jr., Hamilton Square, N.J.

[73] Assignee: RCA Corporation, New York, N.Y.

[21] Appl. No.: 493,805

[22] Filed: May 17, 1983

Related U.S. Application Data

[63] Continuation-in-part of Ser. No. 383,290, May 28, 1982, abandoned.

[51] Int. Cl.³ .............................................. H04N 5/04
[52] U.S. Cl. ......................................... 358/13; 358/19
[58] Field of Search ....................... 358/13, 12, 17, 18, 358/19, 20; 375/25, 28; 340/347 AD, 347 SH

[56] References Cited

U.S. PATENT DOCUMENTS

| | | | |
|---|---|---|---|
| 3,946,432 | 3/1976 | Goldberg et al. | 358/13 |
| 4,122,487 | 10/1978 | Beaulier et al. | 358/13 |
| 4,376,948 | 3/1983 | Dischert et al. | 358/13 |

FOREIGN PATENT DOCUMENTS 1527453 10/1978 United Kingdom .

*Primary Examiner*—Tommy P. Chin
*Attorney, Agent, or Firm*—E. M. Whitacre; P. J. Rasmussen; P. M. Emanuel

[57] ABSTRACT

A digital signal processing system of a television receiver includes a digital to analog converter for converting an analog television signal to representative digital samples at times corresponding to pulses of a sampling signal. Clock signal generating is provided to selectively shift the phase of the sampling signal from that corresponding to the −(B-Y) and (R-Y) color reference vectors to that corresponding to the I and Q, color reference vectors as modified by a tint adjustment, at a time during each horizontal scanning interval before beginning of the image interval. In this manner, digital −(B-Y) chrominance samples corresponding to the peaks of the color burst signal component are made available for digital automatic chrominance gain control and digital I and Q chrominance samples are made available for digital color demodulation.

11 Claims, 13 Drawing Figures

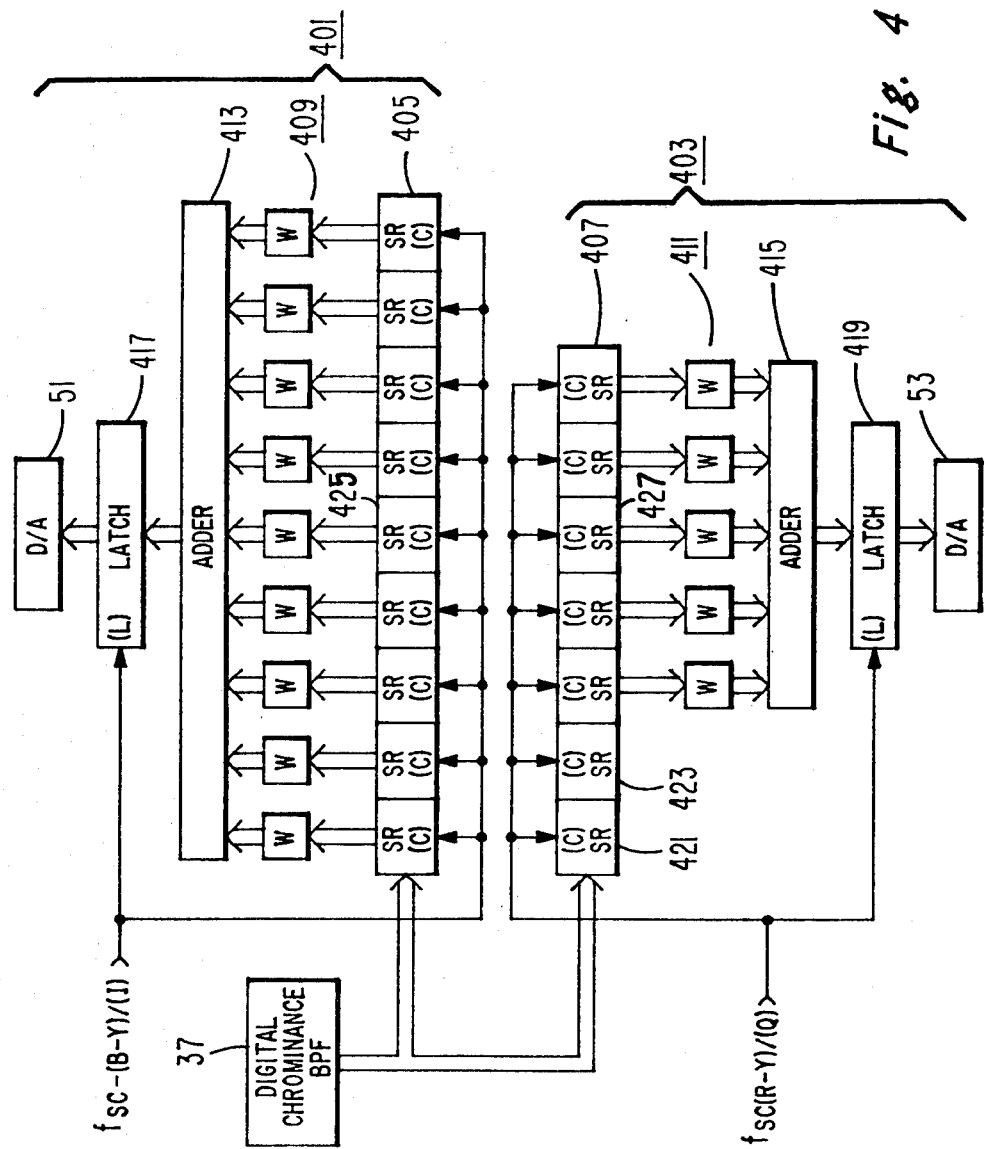

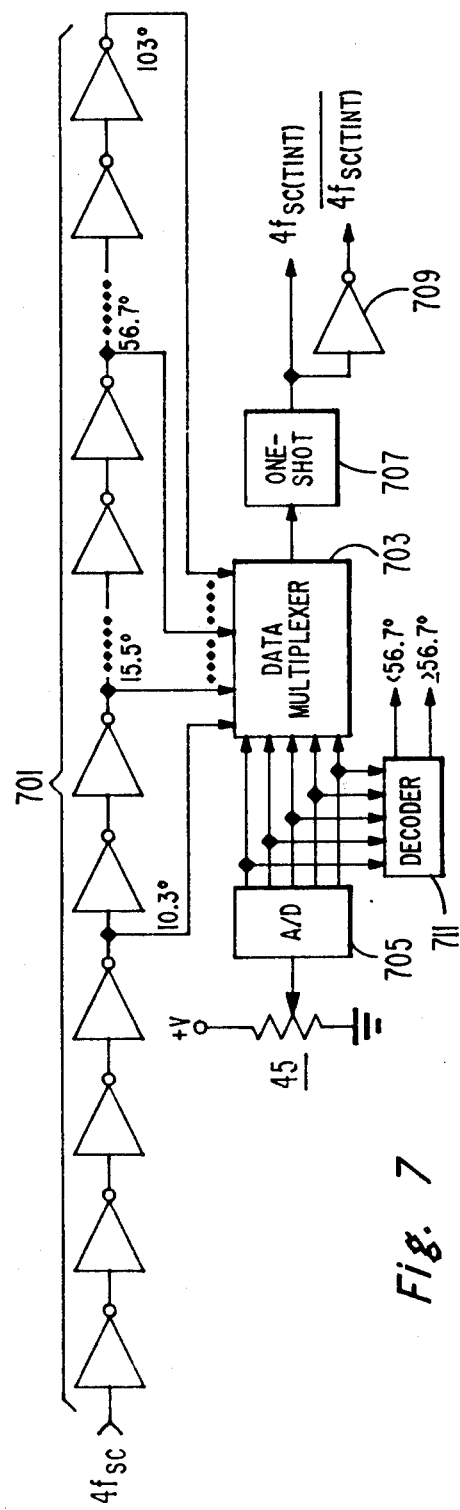
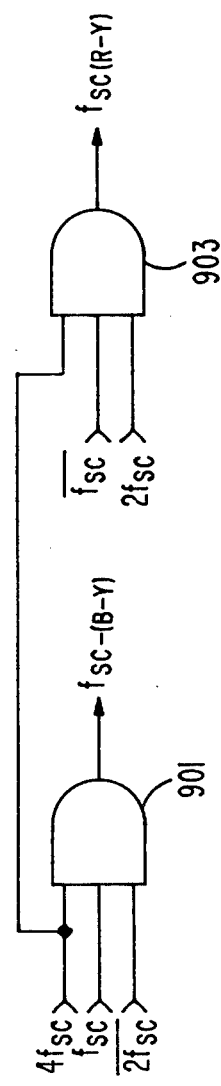
Fig. 7
Fig. 9

CLOCK GENERATION APPARATUS FOR A DIGITAL TELEVISION SYSTEM

This is a continuation-in-part application of Ser. No. 383,290 filed on May 28, 1982 having the same title, inventor and assignee as the present application, now abandoned.

The present invention concerns clock generation apparatus for a digital television system.

In digital television receivers, an analog baseband video signal is sampled and the samples converted to representative digital samples by an analog-to-digital converter. The digital samples are processed in a digital comb filter to produce digital samples representing separated luminance and chrominance information. The digital luminance and chrominance samples are processed in in respective channels of a digital signal processing section which perform functions similar to those performed by analog luminance and chrominance channels found in presently commercially available television receivers. Digital-to-analog converters convert the digital samples produced by the luminance and chrominance channels of the digital signal processing section to analog signals representing image display information which are coupled to a kinescope in conventional fashion.

In order that the digital samples generated by the analog-to-digital converter accurately represent the analog baseband video signal, in accordance with the Nyquist sampling criteria, the frequency at which the analog baseband signal is sampled must be at least twice the highest frequency of interest of the analog baseband video signal. Since it is desirable that the sampling signal be consistently related in phase to the analog baseband video signal in order not to introduce distortion in the reproduced image, the sampling signal is derived from the color burst signal component of the baseband video signal. Thus, the sampling signal may be derived by an arrangement which extracts the color burst component from the baseband video signal and a phase locked loop which locks an oscillator operating at frequency which is an integer multiple of the frequency of the burst signal, referred to as the color subcarrier frequency $f_{sc}$, to the color burst signal.

By way of example, in the United States the highest frequency of interest in the baseband video signal is around 4.2 MHz and the color subcarrier frequency $f_{sc}$ is approximately 3.58 MHz. Accordingly, the lowest frequency of the sampling signal derived from the color burst signal that may be used to satisfy the Nyquist criterion is $3f_{sc}$. Because it has been found that the demodulation of color burst signals, as described below, can more readily be realized when the sampling signal is an even multiple of the color subcarrier frequency, the most often proposed frequency for the sampling signal is $4f_{sc}$.

One of the functions that must be performed by the chrominance channel of the digital signal processing section is that of color demodulation by which the digital chrominance samples occurring at times corresponding to predetermined phase angles of the color burst component associated with respective color demodulation color reference vectors are selected and provided at respective outputs. The resultant digital samples can then be used to produce color signals for determining the color content of the reproduced image. Typically, the color reference vectors chosen for color demodulation correspond either to the 0° and 90° phase points of the color burst signal or to the 57° and 147° phase points of the burst signal. The former are commonly referred to as the −(B-Y) and (R-Y) color reference vectors and the latter are commonly referred to as the I and Q color reference vectors. It has been found more desirable to perform color demodulation with respect to the I and Q color reference vectors then with respect to the −(B-Y) and (R-Y) color reference vectors since signals corresponding to the I color reference vector have a relatively broad frequency range. In addition, the human eye is more sensitive to such signals since they correspond to flesh tones.

It is also desirable that the chrominance channel of the digital signal processing section be responsive to user controls for adjusting the tint or hue of the reproduced image as desired. A digital color demodulator including provisions for tint or hue control is described in copending U.S. patent application Ser. No. 297,556 filed on Aug. 31, 1981 in the name of Lewis and assigned like the present application to RCA Corporation. In the system described in that application, color demodulation is accomplished by aligning the phase of the sampling signal so that samples are produced by the A/D converter at times corresponding to the phase angles of the color burst signal associated with the I, Q, −I and −Q color reference vectors and then selecting the samples which occur at times corresponding to the I and Q color reference vectors and providing them at respective outputs. Tint or hue control is accomplished by adjusting the phase angle of the sampling signal.

Another function that must be performed by the chrominance channel of the digital signal processing section is that of controlling the amplitude of the digital chrominance signals both automatically, to set the amplitude of the color signals in a range suitable for digital processing, and in response to manual user controls, to set the color level to that desired by a user. Such control apparatus is described in copending U.S. patent application Ser. No. 359,433 filed on Mar. 18, 1982 in the names of Lewis and Eliscu and also assigned to RCA Corporation. In the apparatus described in that application, the automatic color control apparatus includes a burst sampler which examines the magnitude of digital samples in the chrominance channel which occur in the color burst interval. The digital burst samples are compared to a digital reference level to generate a color amplitude control signal. Advantageously, for this purpose, the phase of the sampling signal is aligned so that digital samples corresponding to the peaks of the color burst signal are available in order to obtain the highest possible amplitude for the samples and therefore improve the noise performance of the system. The peaks of the color burst signal occur at multiples of 180° from the phase point which correspond to the −(B-Y) color reference vector.

Unfortunately, the desire to perform color demodulation with respect to the I and Q color reference vectors is not consistent with the desire to produce digital samples corresponding to the −(B-Y) color reference vector for the purpose of chrominance gain control. While (R-Y) and (B-Y) samples can be readily obtained from I and Q samples by interpolation as long as the I and Q samples correspond to the fixed phase angles of the I and Q color reference vectors, that condition does not exist when the phase of the sampling signal is adjusted to accomplish phase control.

Thus, there is a need for a digital color television signal processing system which includes an arrangement for examining digital samples corresponding to peaks of the color burst signal which occur at times corresponding to the phase of the −(B-Y) color reference vector and which is consistent with controlling the phase of the sampling signal for the purposes of tint adjustment.

In accordance with the present invention, a digital processing apparatus is provided for a television system wherein the phase of the sampling system is selectively caused to have a constant phase relative to the burst signal component during a first time interval including at least a portion of one color burst interval and caused to have a second phase within a range of phases relative to the burst signal component during a second interval in which an image is reproduced. In a specific embodiment, during each horizontal scanning interval, the phase of the sampling signal is caused to have a phase so that digital samples corresponding to −(B-Y), (R-Y), and (B-Y) and −(R-Y) color reference vectors are produced during a portion of the color burst interval and thereafter caused to have a phase so that digital samples are produced corresponding to the I, Q, −I and −Q color reference vectors as modified in accordance with a tint setting.

The present invention will be described with reference to the accompanying Drawing in which:

FIG. 4 shows in logic diagram form an implementation of the digital color demodulator shown in block form in FIG. 4;

Figure 1:
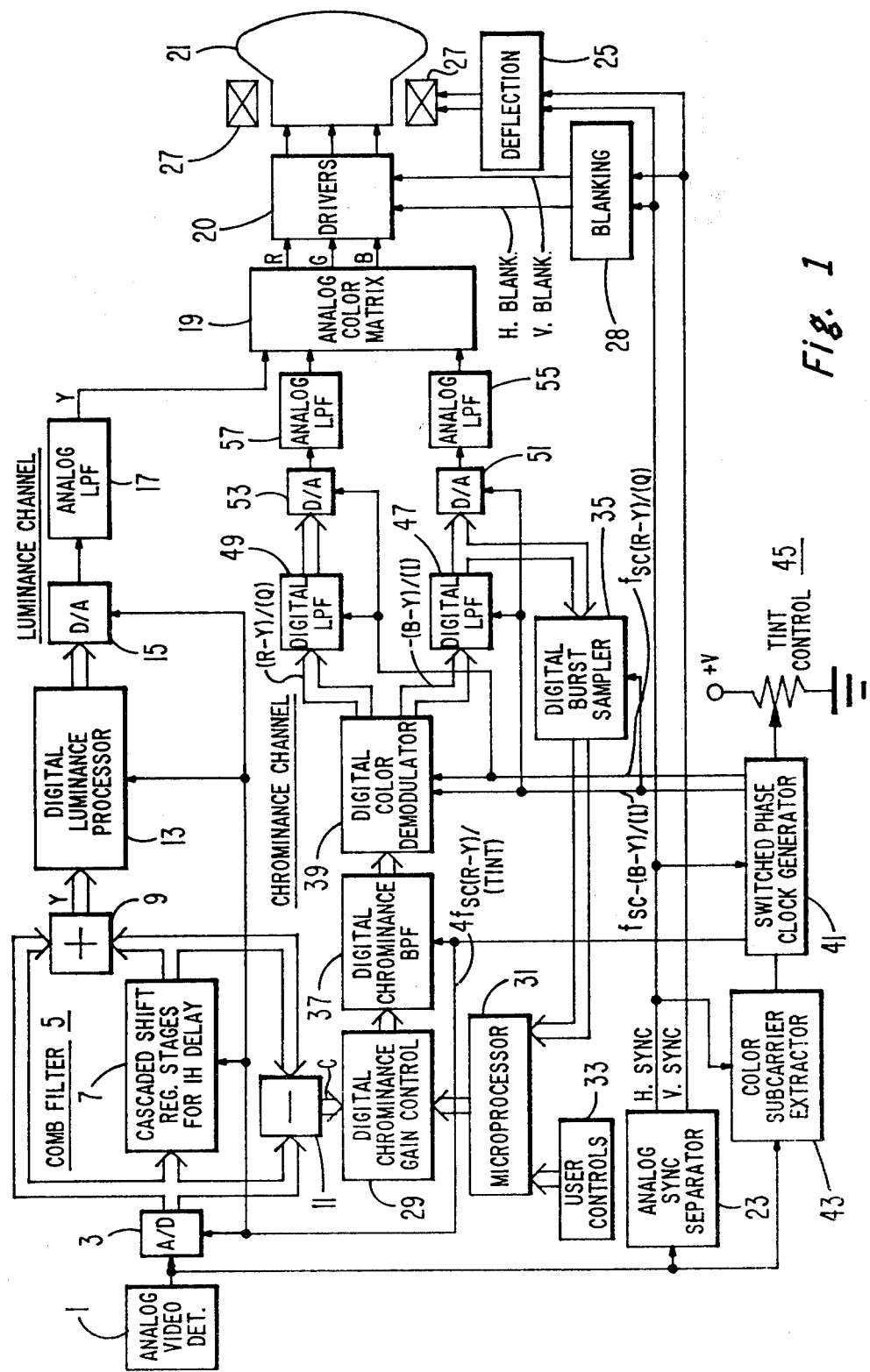
FIG. 1 shows in block diagram form a digital television receiver employing an embodiment of the present invention.
Figure 5A:
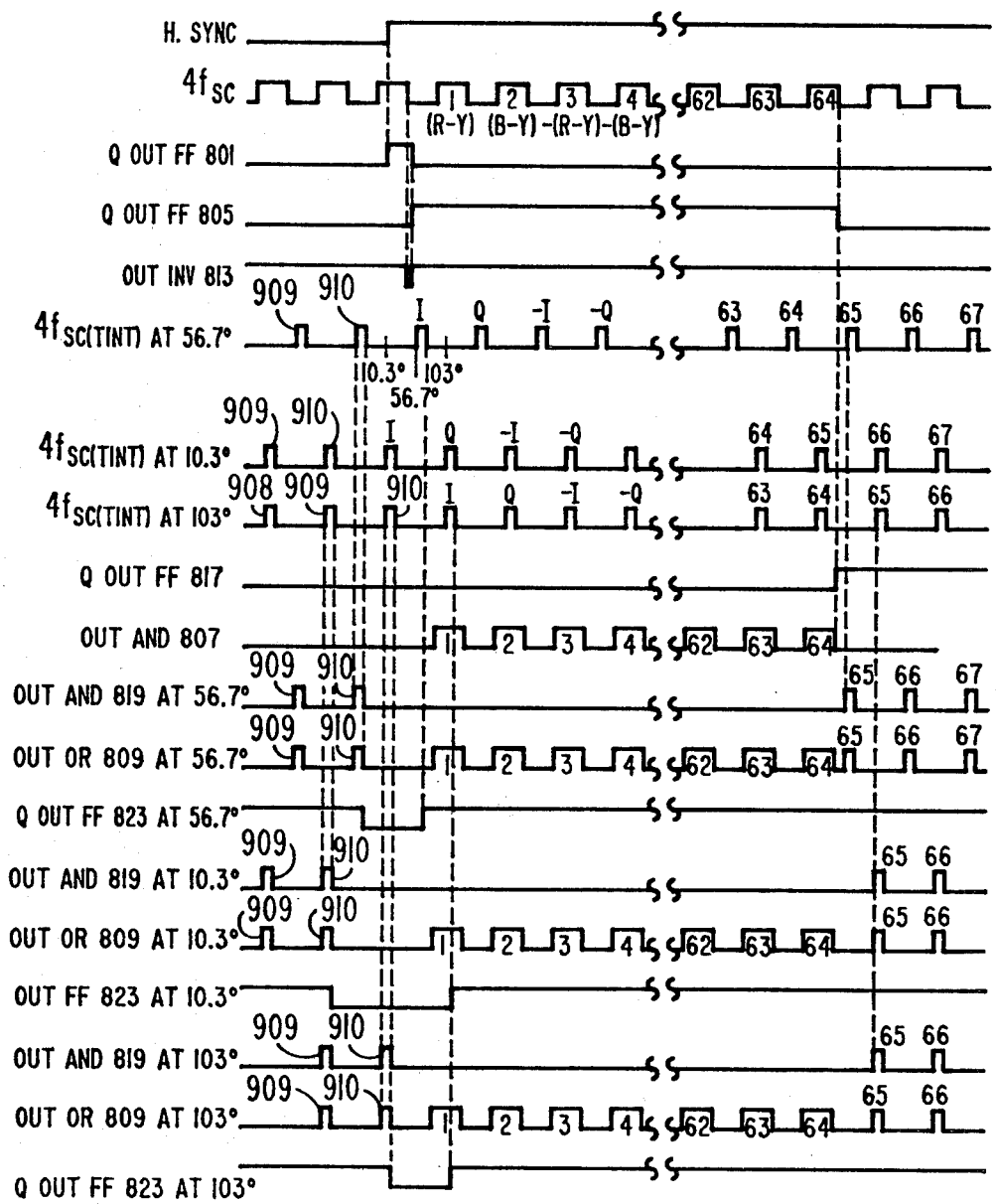
Figure 5B:
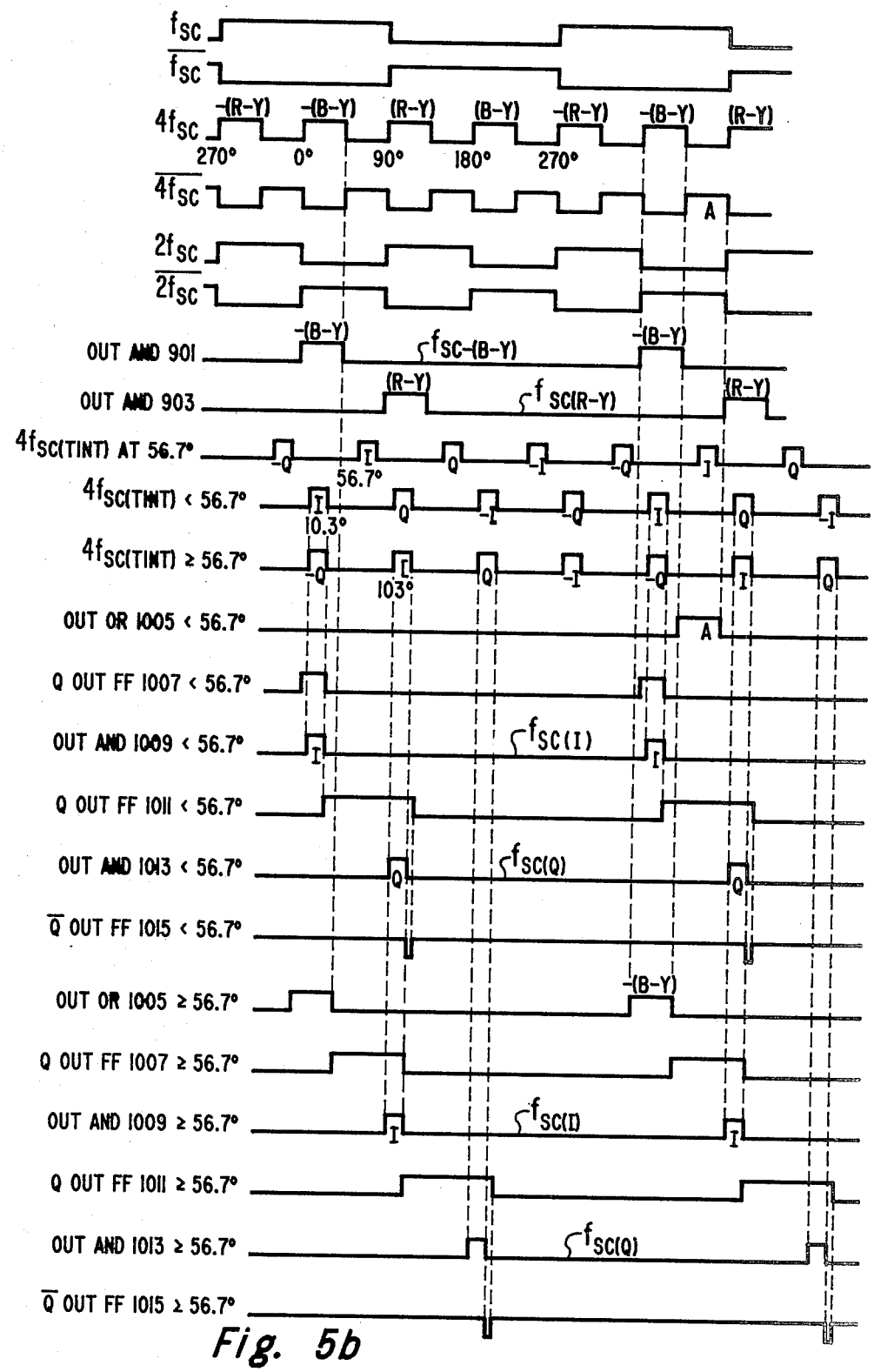
Figure 5C:
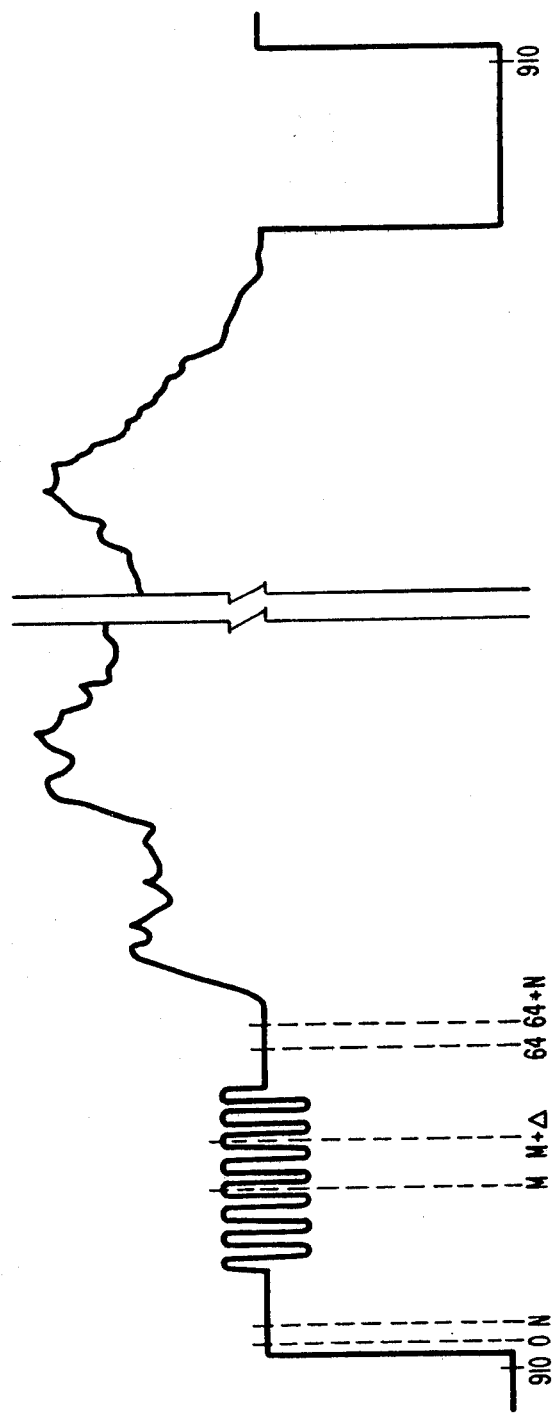

FIGS. 5a, 5b and 5c show signal waveforms useful in understanding the apparatus shown in FIGS. 6, 7, 8, 9, 10 and 11; and FIGS. 6, 7, 8, 9, 10 and 11 show in logic diagram form implementations of various portions of the clock generation arrangement shown in block form in FIG. 1.

In the digital television signal processing system shown in FIG. 1, a video detector 1, such as may be employed in conventional television receivers, supplies an analog baseband video signal including both luminance and chrominance components. An analog to digital (A/D) converter 3 receives the analog baseband video signals and a sampling signal comprising pulses occurring at a sampling frequency. As will be described below, the sampling signal has a frequency equal to $4f_{sc}$, were $f_{sc}$ is the frequency of the color subcarrier, and is locked in phase to the color burst component of the analog video signal. A/D converter 3 converts the analog baseband video signal to representative digital samples which are produced at the sampling frequency. Each digital sample includes an encoded group of bits representing the magnitude and polarity of the baseband video signal at the time the sample is taken.

The digital video samples are coupled to a digital comb filter 5 which produces digital samples representative of luminance information (Y) and digital samples representative of chrominance information (C). Digital comb filter 5 is constructed in analogous manner to analog comb filters well known in the television signal processing field to separate analog luminance and chrominance signals from a composite analog video signal. In one type of known analog comb filter, a delay element such as a CCD (charge coupled device), is provided to delay the composite video signal by a time interval corresponding to one horizontal scan line (1H). The delayed video signal is added to the undelayed video signal to produce a signal representing luminance information and the delayed video signal is subtracted from the undelayed to produce a signal representing chrominance information.

In digital comb filter 5, the delay element comprises a number of plural bit shift registers connected in series in a cascade 7. The number of cascaded stages is selected to provide a 1H time delay. Each stage stores a digital sample and therefore has a number of cells equal to the number of bits in the digital samples produced by A/D converter 3. The digital samples are shifted in parallel from one stage to the next in response to pulses of the sampling signal. In the NTSC system, the time to scan one horizontal line is 63.55 microseconds. Since the pulses of the sampling signal occur at a rate of 14.32 MHz, which corresponds to one pulse every 69.8 nanoseconds, 910 shift register stages are required to produce a 1H delay. The delayed digital samples produced by cascaded shift registers 7 are combined with respective undelayed digital samples by an adder 9 to produce digital luminance (Y) samples and by a subtractor 11 to produce digital chrominance (C) samples.

The digital luminance (Y) samples are applied to a digital luminance processor 13 which modifies the characteristics of the luminance information in response to the settings of user controls (not shown) corresponding to the brightness and contrast properties of the reproduced image. Brightness control may be accomplished by adding a digital signal representative of the desired brightness level to the digital luminance samples. Contrast control may be accomplished by digitally multiplying the digital luminance samples by a gain factor corresponding to the desired contrast level. Digital luminance processor may also include apparatus for enhancing the detail content of the luminance information such as is disclosed in U.S. patent application Ser. No. 319,090 filed on Nov. 6, 1981 in the name of H. G. Lewis and A. Acampora. Digital luminance processor 13 is also clocked by the pulses of the sampling signal.

The processed digital luminance samples are converted to a corresponding analog luminance signal by a digital to analog (D/A) converter 15. D/A converter 15 is also clocked by the pulses of the sampling signal. An analog low pass filter (LPF) 17 removes undesired frequency components of the analog luminance signal corresponding to the sampling process. The resultant luminance signal is combined with analog I and Q color signals, generated as described below, in a color matrix 19 to produce R, G and B signals representing red, green and blue image information. The R, G and B signals are amplified by drivers 20 and coupled to electron guns of a kinescope 21. Color matrix 19 and drivers 20 may be of the conventional type presently employed in commercially available television receivers.

A synchronization ("sync") signal separator 23 is responsive to the analog baseband video signals provided by video detector 1 for generating horizontal and vertical sync pulses. A deflection unit 25 is responsive to the sync pulses to generate horizontal and vertical deflection signals for deflection windings 27 of kinescope 21. The horizontal and vertical deflection signals cause the electron beams generated by the electron guns of kinescope 21 to be horizontally scanned during successive horizontal scan lines until a field is complete. At the end of each horizontal scan line, the electron beams are caused to be horizontally retraced to beginning of the next line. At the end of each field, the electron beam are caused to be vertically retraced to the beginning of the next field. So that disconcerting lines are not produced during the retrace intervals, horizontal and vertical blanking signals are generated by a blanking generator 28 and in response to the horizontal and vertical synchronization pulses to disable kinescope 21 from generating an image during the retrace intervals. Sync separator 23, deflection unit 25 and blanking generator 28 may be of the same type presently employed in commercially available analog television receivers.

The digital chrominance samples generated by digital comb filter 5 are applied to a digital chrominance gain control unit 29 which modifies their magnitude in response to control words generated by a microprocessor 31 in accordance with the setting of user controls 33 and the magnitude of digital samples representing the magnitude of the color burst signal measured by a burst sampler 35. Chrominance gain control unit 29 may, for example, comprise an apparatus for shifting the bits of the digital chrominance samples to successively higher or lower bit positions for multiplying or dividing, respectively, the digital chrominance samples by factors of 2 under the control of microprocessor 31 and a RAM for multiplying the magnitude of the digital chrominance samples by a non-integer gain factor also under the control of microprocessor 31. Such a chrominance gain control system is described in U.S. patent application Ser. No. 359,433 filed on Mar. 18, 1982 in the names of H. G. Lewis, Jr. and S. M. Eliscu. In that chrominance gain control system, there are two data shifters and a RAM located at different locations within the chrominance channel. Since the manner of in which the gain control elements are distributed is not germane to the present invention, for the sake of simplicity, chrominance gain control unit 29 is shown as being located at a single location in the chrominance channel.

The digital chrominance samples produced at the output of gain control unit 29 are coupled to a digital chrominance band pass filter (BPF) 37. Digital chrominance BPF 37 comprises a so-called finite impulse response (FIR) filter which shapes the frequency response of the chrominance channel to produce an essentially flat amplitude versus frequency characteristic for chrominance information between approximately 2.1 MHz and 4.2 Mhz A suitable digital chrominance FIR filter of this type is described in U.S. patent application Ser. No. 319,061 filed on Nov. 6, 1981 in the name of A. Acampora. Briefly, an FIR filter includes a number of cascaded plural bit shift register stages in which digital samples received at an input are shifted from one stage to the next in response to clock pulses to produce a number of delayed digital samples. The magnitude of the delayed digital samples are modified by weighting units and the resultant delayed and weighted digital samples are combined to produce digital samples representing an analog signal with a desired frequency response characteristic. Since the passband of the chrominance information is approximately 2 MHz wide in the NTSC system, the sampling signal, with a frequency of $4f_{sc}$ is also used as the clock signal for the shift registers of digital chrominance BPF filter 37.

The digital chrominance samples produced by digital chrominance filter 37 are applied to a digital color demodulator 39 which generates separate digital samples representing the magnitude of color information signals represented by the digital chrominance samples at respective times corresponding to predetermined phases of the color burst signal.

Figure 2:
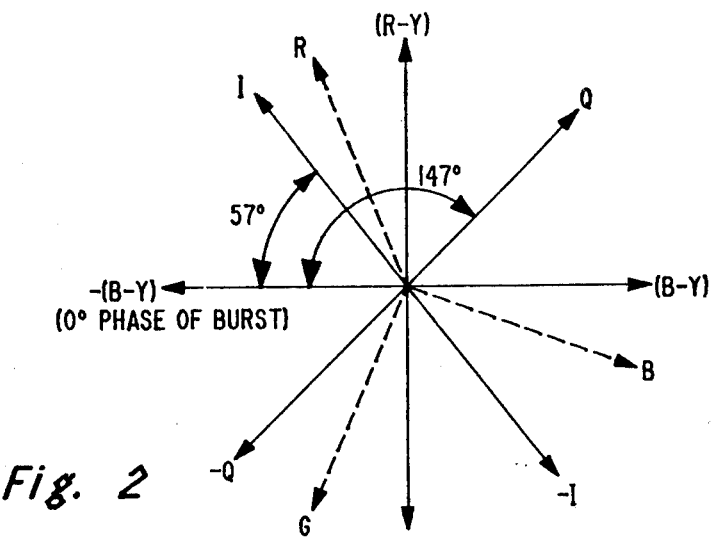
FIG. 2 shows a vector diagram useful in understanding the color demodulation apparatus of the digital television receiver shown in FIG. 1.

The color demodulation process can be better understood with reference to FIG. 2 which shows (B-Y), (R-Y), −(B-Y), (-R-Y), I, Q, −I and −Q color reference vectors corresponding to chrominance signal components having predetermined phase relationships with the color burst component used in the transmission of color information in the NTSC system. The vectors corresponding to the primary colors red (R), green (G) and blue (B) are also shown in FIG. 2. Since the vectors of the primary colors are between respective two color reference vectors which are 90° apart, the primary color vectors can be mathematically expressed as the sum of components of two color reference vectors. As is seen, the primary colors can be related to either (R-Y) and (B-Y) color reference vectors or I and Q colors reference vectors. Thus, if the amplitude of the chrominance signal at phase angles corresponding to either the (R-Y) and (B-Y) color reference vectors or the I and Q color reference vectors are known, the amplitudes of the R, G and B color components can be determined.

It has been found desirable to encode color information at the transmitter and therefore to demodulate the color information in the receiver relative to the phase angles of the I and Q color reference vectors. This is so because while the frequency spectrums of color signal components with phase angles corresponding to the I and Q color reference vectors extend to 1.5 MHz and 0.5 MHz, respectively, the frequency spectrums of color signals with phase angles corresponding to the (B-Y) and (R-Y) color reference vectors each extend only to 0.5 MHz. In addition, a color signal component with the I phase angle corresponds to a reddish-orange color approximating a so-called flesh tone to which the human eye is particularly sensitive.

To accomplish color demodulation digitally, digital chrominance samples must be produced which occur at times corresponding either to the phase angles of the (R-Y) and (B-Y) vectors or the I and Q vectors and those samples must be individually selected from the digital chrominance samples produced at the output of digital BPF 37. To that end, the sampling signal must include pulses occurring at the times corresponding to a selected pair of color reference vectors, i.e., either the (R-Y) and (B-Y) color reference vectors or the I and Q color reference vectors so that the digital video samples produced by A/D converter 3 will include digital samples corresponding to the color reference vectors and individual clock signals must be generated which include pulses only corresponding to one of the color reference vectors of the selected pair of color reference vectors so that the respective samples can be selected from the digital chrominance samples produced at the output of digital BPF 37. The waveforms shown in FIG. 3 graphically illustrate such sampling and clock signals.

Figure 3:
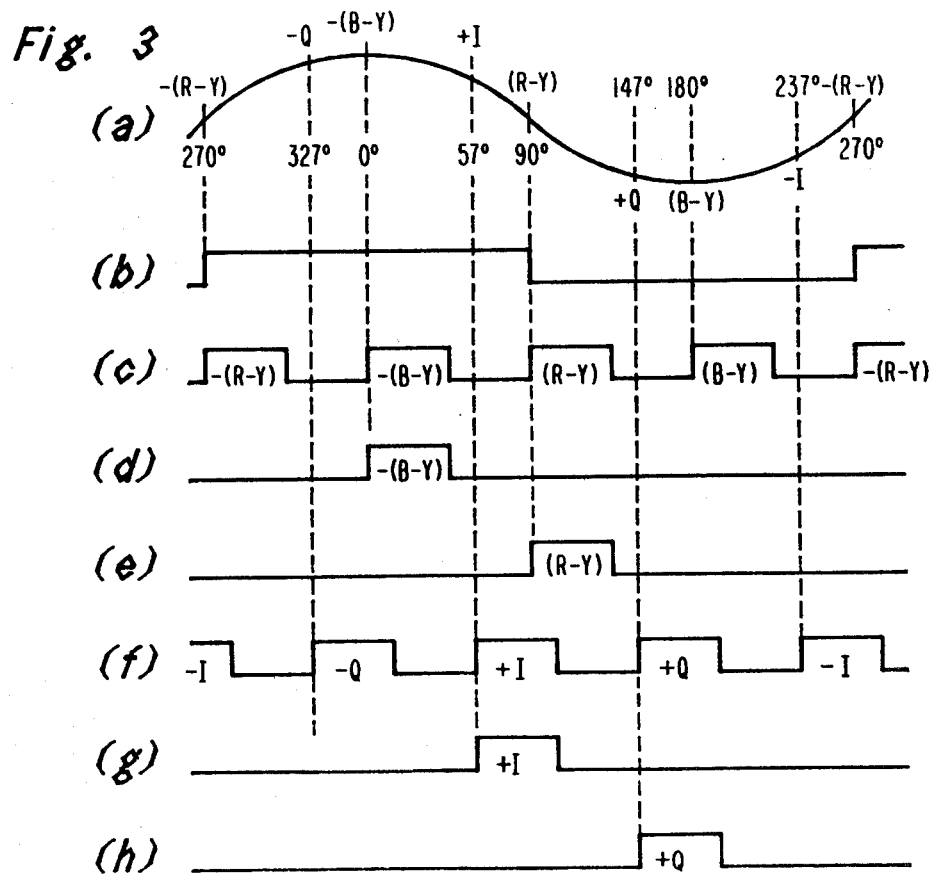
FIG. 3 shows signal waveforms useful in understanding the color demodulation apparatus of the digital television receiver shown in FIG. 1.

In FIG. 3, waveform A illustrates one cycle of the analog color burst signal. The times corresponding to the (R-Y), (B-Y), −(R-Y), −(B-Y), I, Q, −I and −Q color reference phases are indicated by the dotted lines. Waveform B illustrates a square wave which is in phase with the color burst signal. Waveform C illustrates the $4f_{sc}$ sampling signal which is to be used when the $-(B-Y)$ and (R-Y) vectors are selected for color demodulation. Waveform D and E illustrate clock signals including only pulses corresponding to $-(B-Y)$ and (R-Y) color reference vectors, respectively, which are to be used when the $-(B-Y)$ and (R-Y) color reference vectors are selected for color demodulation. Waveform F illustrates the $4f_{sc}$ sampling signal which is to be used when the I and Q vectors are selected for color demodulation. Waveforms G and H illustrate clock signals, including only pulses corresponding to the I and Q color reference vectors, respectively, which are to be used when the I and Q vectors are selected for color demodulation. The clock signals illustrated in waveforms D, E, G and H have a frequency of $f_{sc}$ since the times corresponding to the respective color reference vector $-(B-Y)$, (R-Y), I and Q occur once during each color burst cycle.

Since adjustment of the phases of the $4f_{sc}$ sampling signal and the $f_{sc}$ color demodulation clock signals corresponds to a change of the angles of color reference vectors, hue or tint control may be accomplished by controlling the phase of the $4f_{sc}$ sampling signal and correspondingly controlling the phases of the $f_{sc}$ color demodulation clock signals relative to the burst phase as will be explained below.

For the reasons to be discussed below, in the digital television system shown in FIG. 1, in accordance with a principle of the present invention, color demodulation selectively occurs with respect to the $-(B-Y)$ and (R-Y) color reference vector during a first time interval in which kinescope 21 is retraced and no visible image is produced and with respect to the I and Q color vectors during a second time interval in which kinescope 21 is scanned to produce a visible image. To that end, a clock generator 41 which derives the $4f_{sc}$ sampling signal and the $f_{sc}$ color demodulation clock signals in response to a signal, generated by a color subcarrier extractor 43, having a frequency equal to the color subcarrier frequency, $f_{sc}$, and locked in phase to the color burst signal component, selectively sets the phase of the $4f_{sc}$ sampling signal and the phases of the $f_{sc}$ color demodulation clock signals to correspond to the phases of waveforms C, D and E, respectively, of FIG. 3 during the first time interval and to correspond to the phases of waveforms F, G and H, respectively, of FIG. 3 during the second time interval. In addition, the phases of the sampling signal and demodulation clock signals employed during the second interval are made adjustable in response to the setting of a potentiometer 45 to affect tint control. To indicate that the phases of the $4f_{sc}$ sampling signal and the color demodulation clock signals generated by switch phase clock 41 are switched in the manner set forth above, the $4f_{sc}$ sampling signal is labeled $4f_{sc(R-Y)/(TINT)}$ and the $f_{sc}$ color demodulation clock signals are labeled $f_{sc-(B-Y)/(I)}$ and $f_{sc(R-Y)/(Q)}$ in FIG. 1.

The color demodulation clock signals, $f_{sc(B-Y)/(I)}$ and $f_{sc(R-Y)/(Q)}$ are coupled to digital color demodulator 39. When the phases of the $4f_{sc(R-Y)/(TINT)}$ sampling signal and the $f_{sc-(B-Y)/(TINT)}$ and $f_{sc(R-Y)/(Q)}$ color demodulation clock signals correspond to the phases of waveforms C, D and E, respectively, of FIG. 3, digital samples representing $-(B-Y)$ and (R-Y) color information are produced by demodulator 39. When the phases of the sampling signal and color demodulation clock signals correspond to the phases of waveform F, G and H, respectively, of FIG. 3, digital samples representing I and Q color information are produced by demodulator 39. The outputs of demodulator 39 are labeled $-(B-Y)/(I)$ and $(R-Y)/(Q)$ to indicate the selective nature of the color demodulation process. The $-(B-Y)/(I)$ and $(R-Y)/(Q)$ digital samples produced by demodulator 39 are applied to respective ones of digital low pass filter (LPF) 47 and 49 which also receive respective ones of the $f_{sc-(B-Y)/(I)}$ and $f_{sc(R-Y)/(Q)}$ color demodulation clock signals. Digital low pass filters 47 and 49 are FIR filters arranged to have cutoff frequencies corresponding to the limits of the I and Q color components, namely, 1.5 MHz and 0.5 MHz, respectively. While demodulator 39 and digital filters 47 and 49 are shown as separate units for the sake of describing their respective functions, they may be combined into a unified structure which will now be described with reference to FIG. 4.

As shown in FIG. 4, the unified structure of color demodulator 39 and low pass filters 47 and 49 comprise two FIR filters 401 nd 403. The FIR filters include a respective cascade of series connected plural bit shift register stages 405 and 407. The cascades of shift registers form the delay elements of the FIR filters. The digital samples produced at the output of digital chrominance bandpass filter 37 are applied in parallel to the first stage of each of the cascade of the shift register stages. The $f_{sc-(B-Y)/(I)}$ clock is coupled to the clock (C) input of each stage in cascade 405 and the $f_{sc(R-Y)/(Q)}$ clock signal is coupled to the clock input of each storage in cascade 407. In response to each pulse of the $f_{sc-(B-Y)/(I)}$ clock signal, the digital sample produced by digital chrominance BPF 37 at that time is loaded into the first stage of cascade 405 and the digital samples already stored in the stages (including the first stage) of that cascade are shifted to the respective next stage. In like manner, in response to each pulse of the $f_{sc(R-Y)/(Q)}$ the digital sample produced by digital chrominance BPF 37 at that time is loaded into the first stage of cascade 407 and the digital samples already stored in the stages of that cascade are shifted to the respective next stage. In this manner, the samples corresponding to the respective clock signals are separated.

As the digital samples are shifted through the respective cascade, delayed samples are produced at the outputs of the stages. The magnitudes of delayed samples are modified by fractional factors in respective weighting units 409 and 411. Weighting units 409 and 411 may comprise shift registers for shifting the bits of respective delayed samples to lower bits positions and an adder or subtractor for combining the shifted samples. The delayed and weighted digital samples are combined by adders 413 and 415 to produce separated color samples. The separated digital color samples are coupled to respective latches or storage registers 417 and 419 which also receive the respective color demodulation clock pulses at their load (L) inputs. As the digital color samples are produced at the outputs of adders 413 and 415, they are stored in storage registers 417 and 419, respectively, in response to the pulses of the respective color demodulation clock pulses occurring at that time. The samples stored in latches 417 and 419 are coupled to D/A converters 51 and 53 (also shown in FIG. 1).

The number of shift register stages and weights imparted by the weighting units determine the frequency response characteristics of FIR filters 401 and 403. Because of the differing frequency response characteristics of FIR filters 401 and 403, filter 401 has more shift register stages than does filter 403. However, in order to ensure that the separated digital color samples are in proper phase alignment, extra shift register stages, represented by stages 421 and 423, are added to the beginning of cascade 407. In this manner the average delays imparted by filters 401 and 403, those average delays being exhibited by the delayed samples developed at the outputs of center stages 425 and 427 of cascades 405 and 407, respectively, are substantially the same.

Now referring again to FIG. 1, as noted with respect to FIG. 4, the digital color samples produced by digital low pass filters 47 and 49 are applied to respective D/A converters 51 and 53 which also receive the respective color demodulation clock signals $f_{sc-(B-Y)/(I)}$ and $f_{sc(R-Y)/(Q)}$. D/A converters 51 and 53 convert the digital color samples to respective analog color signals which are filtered by analog low pass filters 55 and 57 to remove undesired signal components due to the sampling process. The resultant analog color signals are applied to color matrix 19 for combination with the luminance signal to produce the R, G and B primary color signals.

It is noted that while demodulator 39, low pass filters 47 and 49 and D/A converters 51 and 53 only receive clock signals having the frequency of the color subcarrier, $f_{sc}$, the Nyquist criteria is satisfied with respect to these units since the bandwidth of the separated color signals is less than $\frac{1}{2}f_{sc}$.

The digital samples produced by filter 47 are also applied to burst sampler 35 which digitally measures the amplitude of the color burst component. The measured burst amplitude is applied to microprocessor 31 for use in controlling the gain factor of digital chrominance gain control unit 29. Burst sampler 35 measures the amplitude of the color burst component by sampling the digital color signals at predetermined times. In order to obtain the optimum signal to noise ratio in the burst measurement, it is desirable to take the burst samples at times corresponding to the peaks of the color burst signal. From FIG. 3 it is seen that peaks of the color burst signal represented by waveform A occur at times corresponding to the $-(B-Y)$ pulses of the $4f_{sc}$ sampling signal represented by waveform C. For that reason, it is desirable that the $4f_{sc}$ sampling signal and the $f_{sc}$ color demodulation clock signals have phases corresponding to waveforms C, D and E, respectively, of FIG. 3 so that digital color samples corresponding to the peaks of the color burst signal are available for the burst measurement.

However, for the reasons stated above, color demodulation is more desirable with respect to the I and Q color reference vectors. For that reason, it is desirable that the $4f_{sc}$ sampling signal and the $f_{sc}$ color demodulation clock signals have phases corresponding to waveforms F, G and H, respectively, of FIG. 3. In that case, the value of peaks of the color burst signal could be obtained by interpolation from either the digital samples taken at the times corresponding to the I pulses or the digital samples from the samples taken at the times corresponding to the Q pulses according to the expressions:

$$-(B-Y) = I/\cos 57° \quad (1)$$

$$(R-Y) = I/\cos 33° \quad (2)$$

Expressions (1) and (2) are based on the assumption that the I and Q clock signals have phases corresponding to the I and Q color reference vectors indicated in FIG. 2. However, the above assumption is not satisfied if the phases of the I and Q clock signals are adjustable to affect tint or hue control as is the case in the present digital television signal processing system.

Accordingly, in the digital television processing system shown in FIG. 1, clock generator 41 is coupled to sync separator 23 and responsive to the horizontal synchronization (H.SYNC) pulses for selectively causing the $4f_{sc}$ sampling signal and $f_{sc}$ color demodulation clock signals to have phases corresponding to waveforms F, G and H of FIG. 3 as modified by the tint control setting during the active portions of the horizontal scanning intervals in which the image is developed by kinescope 21 for use in color image reproduction and causing the $4f_{sc}$ sampling signal and $f_{sc}$ color demodulation clock signals to have phases corresponding to waveforms C, D and E of FIG. 3 in which the $-(B-Y)$ pulses are aligned with the positive peak amplitude points of the color burst signal during a non-active portion of the horizontal scanning intervals for use in sampling the peaks of the color burst signal component for chrominance gain control.

A preferred embodiment of switched phase clock generator 41 will be described with reference to FIGS. 6 through 11. FIG. 5a is a timing diagram helpful in understanding the circuits shown in FIGS. 6 through 8. FIG. 5b is a waveform helpful in understanding the circuits shown in FIGS. 9 and 10. FIG. 5c is a graphical representation of the video signal during one horizontal scan line helpful in understanding the ciruits shown in FIGS. 8 and 11.

Figure 6:
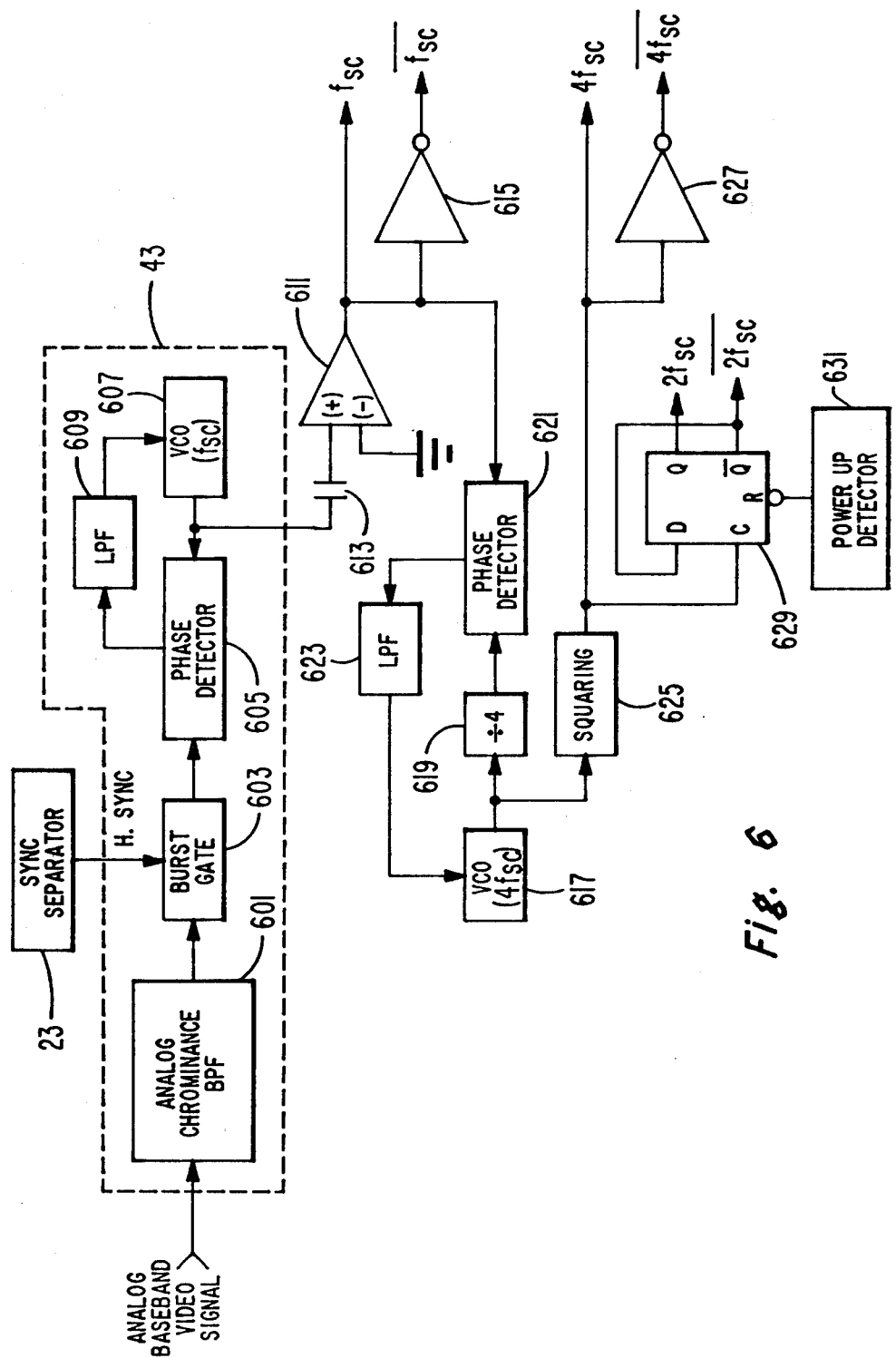

The structure shown in FIG. 6 extracts the color burst component from the analog composite video baseband signal supplied by video detector 1 and generates from it: a square wave signal identified as $f_{sc}$ with a frequency $f_{sc}$ and aligned in phase with the color burst signal; a square wave signal identified as $4f_{sc}$ with a frequency equal to $4f_{sc}$ and having pulses occurring at times corresponding to the phases of the $-(B-Y)$, $(R-Y)$, $(B-Y)$ and $-(R-Y)$ color reference vectors; a square wave identified as $2f_{sc}$ with a frequency equal to $2f_{sc}$ having pulses occurring at times corresponding to the $-(R-Y)$ and $(R-Y)$ color reference vectors; and the logical complements of the signals $f_{sc}$, $4f_{sc}$ and $2f_{sc}$, $\overline{f_{sc}}$, $\overline{4f_{sc}}$ and $\overline{2f_{sc}}$, respectively. These signals are shown in FIG. 5a and 5b.

Referring now to FIG. 6, color subcarrier extractor 43 includes an analog chrominance band pass filter (BPF) 601 having a bandpass characteristic centered at the color subcarrier frequency $f_{sc}$ to which the analog baseband video signal is applied. The output of chrominance BPF 601 is applied to a burst gate 603 which also receives horizontal sync (H.SYNC) pulses from sync separator 23. Burst gate 603 is normally opened and is closed for a predetermined time following each horizontal sync pulse. The predetermined time burst gate 603 is closed is selected to allow the color burst component, comprising a number of color burst cycles, typically 8 to 11 in the NTSC system, to pass through it. Chrominance BPF 601 and burst gate 603 can be constructed in the same manner as corresponding portions of a conventional analog television receiver for extracting the color burst signal component.

The color burst signal component is coupled to one input of a phase comparator 605. The other input of phrase comparator 605 is coupled to the output of a voltage control oscillator (VCO) 607 selected to oscillate in a frequency range including $f_{sc}$. The output signal of phase comparator 605 includes pulses the polarity and width of which represent the sense and magnitude, respectively, of the frequency deviation between the color burst component and the output signal of VCO 607. The output signal of phase comparator 605 is filtered by a low pass filter (LPF) 609 to produce a DC control voltage which is applied to VCO 607 to control its frequency of oscillation. The arrangement of phase comparator 605, LPF 609 and VCO 607 is a phase locked loop for controlling the frequency and phase of the signal produced by VCO 607 so that they substantially equal those of the color burst signal component.

The output signal of VCO 607 is AC coupled to one input of a threshold comparator 611 through a capacitor 613. The other input of comparator 611 is connected to signal ground. Whenever the output signal of VCO 607 exceeds ground potential, a positive-going pulse is generated at the output of comparator 611. The output signal of comparator 611 is the signal $f_{sc}$. An inverter 615 is provided to develop the signal $\overline{f_{sc}}$.

A second phase locked loop (PLL) is provided to develop the signal 4fsc. This PLL includes a second voltage control oscillator 617 selected to oscillate in a frequency range including $4f_{sc}$. The output of VCO 617 is coupled to a frequency divider 619 which divides the frequency of the output signal of VCO 617 by a factor of four. The resulting signal is applied to one input of a phase comparator 621. The other input of phase comparator 621 receives the output signal, $f_{sc}$, of threshold comparator 611. The output signal of phase comparator 621 is filtered by a low pass filter (LPF) 623 to produce a DC control signal for VCO 617. In response to the control signal, the frequency of the signal produced by VCO 617 is adjusted to substantially equal $4f_{sc}$ and its phase is adjusted to be in alignment with the signal $f_{sc}$. The output signal of VCO 617 is also coupled to a squaring circuit 625 including a capacitor and threshold comparator arranged in like manner to capacitor 613 and threshold comparator 611 to produce the signal $4f_{sc}$. An inverter 627 is provided to develop the signal $\overline{4f_{sc}}$.

A data (D) type flip-flop (FF) 629 receives the $4f_{sc}$ signal at its clock (C) input and has its $\overline{Q}$ output coupled back to its data (D) input to form a frequency divider which divides the frequency of the $4f_{sc}$ signal by two to develop the signal $2f_{sc}$ at its $\overline{Q}$ output and the signal $2f_{sc}$ at its Q output. A power up detector 631 generates a negative-going "power-up" pulse whenever power is applied to the system. The output of power up detector 631 is applied to the reset (R) input of D FF629. The negative-going "power-up" pulse resets D FF629 causing a high logic level to be developed at its Q output. As a result, when the first positive-going pulse is applied to the clock input of D FF629, its D input is at the high logic level. This ensures that the positive-going edges of the signal $2f_{sc}$ are synchronized with those of the signal $f_{sc}$ as shown in FIG. 5b.

The structure of FIG. 7 is responsive to the signal $4f_{sc}$ generated by the circuit shown in FIG. 6 and generates a signal $4f_{sc(TINT)}$ also with a frequency equal to $4f_{sc}$ but having pulses occurring at times nominally corresponding to the phases of the I, Q, $-$I and $-$Q color reference vectors but controllable in response to tint adjustments. It also develops the complement of the signal $4f_{sc(TINT)}$, $\overline{4f_{sc(TINT)}}$. The signals $4f_{sc(TINT)}$ and $\overline{4f_{sc(TINT)}}$ are shown in FIGS. 5a and 5b.

In FIG. 7, the signal $4f_{sc}$ is applied to the input of a first one of a plurality of logic inverters 701 which are connected in cascade to form a delay element having a plurality of outputs corresponding to the outputs of various ones of the inverters. Each inverter introduces an incremental time delay corresponding to its propagation delay to the signal $4F_{sc}$ as it passes through the cascade. The incremental delay corresponds to incremental phase shift at the subcarrier frequency $f_{sc}$. Accordingly, the output signals produced at the outputs of cascade 701 have phases differing by an incremental amount relative to the phase of the signal $4f_{sc}$. For example, a CMOS (complementary metal-oxide semiconductor) inverter suitable for use in cascade 701 has a propagation delay of 2 nanoseconds which at the NTSC color subcarrier frequency of 3.58 MHz corresponds to an incremental phase shift or $(2 \times 10^{-9})(3.58 \times 10^{6})(360°) = 2.577°$.

In the circuit shown in FIG. 7, although not all shown for the sake of simplicity, forty-two inverters are used in cascade 701. The first output of the delay line is connected to the output of the fourth inverter and the other outputs are connected to the outputs of every second inverter thereafter. If the inverters are CMOS inverters having a propagation delay of about 2 nanoseconds, signals with delays corresponding phase shifts between 10.3° and 103° at about 5.2° increments are produced at the outputs of the cascade. This range of phase shifts corresponds to that provided in commercially available analog television receivers. The twenty-third inverter produces a delayed signal with a phase shift of 56.7° which is near enough to 57° to be employed for color demodulation with respect to the I and Q color reference vectors.

The outputs of cascade 701 are coupled to respective input terminals of a data multiplexer 703. In response to the digital word at the selection control or address input of data multiplexer 703, data multiplexer 703 couples one of the signals coupled to its input terminals to its output terminal. The digital word applied to the section control input of data multiplexer 703 is generated by a A/D converter 705 in response to the setting of tint control potentiometer 45. Since there are 19 possible phase shift selections in the circuit shown in FIG. 7, a 5 bit A/D converter is adequate for use as A/D converter 705. The signal developed at the output terminal of data multiplexer 703 is coupled to a monostable multivibrator or one-shot 707 which generates a pulse having a predetermined duration less than the duration of the pulses of the signal $4f_{sc}$ in response to each pulse of the output signal of data multiplexer 703. The output signal of one-shot 707 is the signal $f_{sc(TINT)}$. An inverter 709 is provided to develop the signal $\overline{f_{sc(TINT)}}$.

A decoder 711 is responsive to digital word coupled to the selection control or address input of data multiplexer 703 and generates a signal labeled $\geq 56.7°$ having a high logic level when the selection control word corresponds to a phase shift equal to or greater than 56.7° and a signal labeled $<57.7°$ having a high logic level when the selection control word corresponds to a phase shift of less than 56.7°. Decoder 711 may simply comprise a number of "and" gates responsive to groups of the bits of the control word which are high whenever an input signal of data multiplexer 703 corresponds to a phase shift of 56.7° or more is selected followed by an "or" gate responsive to the "and" gates for generating the $\leq 56.7°$ signal and an inverter for inverting the output signal of the "or" gate for generating the $<56.7°$ signal.

Figure 8:
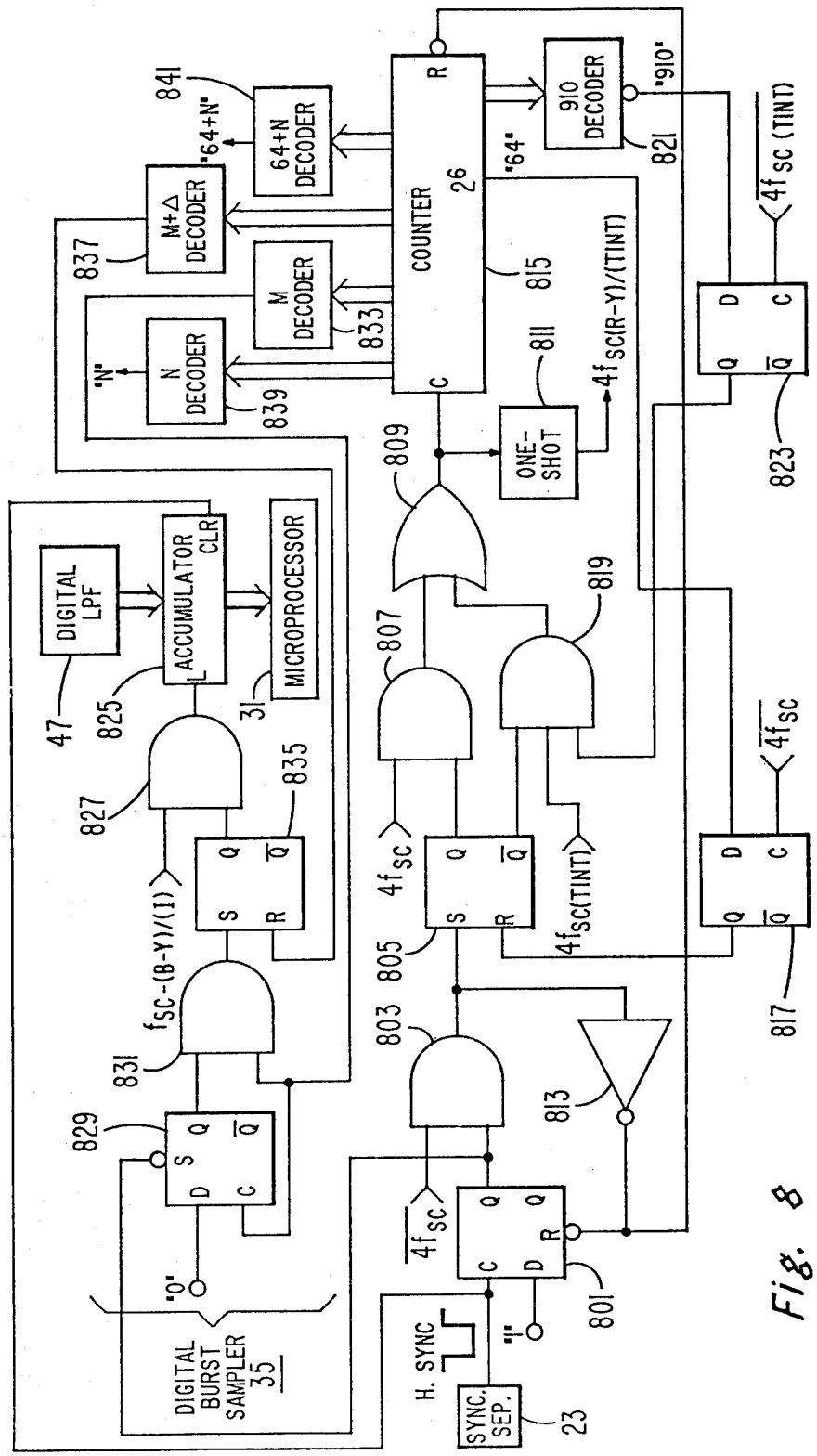

The structure of FIG. 8 selectively generates the $4f_{sc}$ sampling signal for A/D converter 3, digital comb filter 5, digital luminance processor 13, D/A converter 15 and chrominance BPF 37 from the signal $4f_{sc}$ generated by the structure of FIG. 7 during an interval following each horizontal synchronization pulse during which the burst component is present and during which kinescope 21 is disabled from producing an image (i.e., blanked) and generates the $4f_{sc}$ sampling signal from the $4f_{sc(TINT)}$ signal generated by the structure of FIG. 8 during an interval including the active or image portion of the horizontal scan line. Since the pulses of the signal $4f_{sc}$ occur at times corresponding to the phases of the $-(B-Y)$, $(R-Y)$, $(B-Y)$ and $-(R-Y)$ color reference vectors, digital samples corresponding to the peaks of the color burst signal component are available by means of burst sampler 35 for chrominance gain control. Since the pulses of the signal $4f_{sc(TINT)}$ occur at times corresponding to the phase of the I, Q, $-I$ and $-Q$ color reference vectors but modified according to the tint adjustment, digital samples are available for color reproduction.

During the following description of FIG. 8, reference should be made to the timing diagram shown in FIG. 5a. In that timing diagram waveforms are shown which corresponds to the outputs of various elements of the circuit of FIG. 8 for the nominal and extreme phase conditions of the signal $4f_{sc(TINT)}$. Reference to FIG. 5c is also helpful.

In FIG. 8, a data (D) type flip-flop (FF) 801 receives negative-going horizontal sync pulses from sync separator 23 at its clock (C) input. A high logic level (i.e., a "1") is applied to its D input. In response to the positive-going trailing edge of the horizontal sync pulse, a high logic level is developed at the Q output of D FF801. The Q output of D FF801 is coupled to one input of an "and" gate 803. The other input of "and" gate 803 receives the signal $4f_{sc}$. "And" gate 803 is enabled to pass the positive-going pulses of the signal $4f_{sc}$ immediately after the positive-going trailing edge of the horizontal sync pulse since D FF801 is set by that edge. The output of "and" gate 803 is applied to a set (S) input of a set-reset (S-R) FF805. The first positive-going pulse of the signal $4f_{sc}$ after the horizontal sync pulse sets S-R FF805 causing a high logic level to be developed at its Q output. The Q output of S-R FF805 is coupled to an input of an "and" gate 807. The signal $4f_{sc}$ is applied to the other input of "and" gate 807. "And" gate 807 is enabled to pass the positive-going pulses of the signal $4f_{sc}$ after S-R FF805 is set. The positive-going pulses of the signal $4f_{sc}$ are applied through enabled "and" gate 807 and an "or" gate 809 to the input of a monostable multivibrator or "one-shot" 811. One-shot 811 produces a pulse of a predetermined duration at each positive-going edge of the output signal of "or" gate 809 to generate the sampling signal, $4f_{sc(R-Y)/(TINT)}$. The duration of the pulses produced by one-shot 811 is selected to allow adequate time for the operation of A/D converter 3, comb filter 5, digital luminance processor 13, D/A converter 15 and digital chrominance gain control unit 29 to which the sampling signal is coupled.

A logic inverter 813 is coupled between the output of "and" gate 803 and a reset (R) input of D FF801 to reset it, i.e., cause it to develop a low level at its Q output, after the first-positive going edge of the signal $4f_{sc}$ following the positive-going edge of horizontal sync pulse to condition it for operation during the next scan line. The output of inverter 813 is also coupled to a reset (R) input of a counter 815 to reset it to a zero count condition.

The clock (C) input of counter 815 receives the output signal of "or" gate 809. Counter 815 counts the pulses produced at the output of "or" gate 809 and generates signals at predetermined counts to control the selection of either the $4f_{sc}$ or the $4f_{sc(TINT)}$ signal for the generation of the sampling signal. The first control signal is generated when counter 815 reaches a count corresponding to a predetermined time between the end of the color burst interval and before the beginning of the image interval (as shown in FIG. 5c). In the NTSC system the time between the end of the color burst interval and before the beginning of the image interval can vary approximately between 4.33 and 4.60 microseconds. Since 64 times 70 nanoseconds, the period of the $4f_{sc}$ signals, is 4.48 microsecond, 64 is chosen as the first count. If counter 815 is a binary counter, since 64 is equal $2^6$, a count of 64 can simply be detected by determining when a high logic level is developed at the $2^6$ output of counter 815. The "64" count signal is applied to the D input of a D FF817.

The signal $4f_{sc}$ is applied to the clock (C) input of D FF 817. In response to the first positive-going edge of the signal $\overline{4f_{sc}}$ after the generation of the high logic level "64" count signal, D FF817 is set causing a high logic level to be developed at its Q output. The Q output of D FF817 is coupled to the reset (R) input of S-R FF805. In response to the high logic level developed at the Q output of D FF817, S-R FF805 is reset causing a low logic level to be developed at its Q output. The low logic level at the Q output of S-R FF805 disables "and" gate 807 and thereby decouples the signal $4f_{sc}$ from one shot 811. The $\overline{Q}$ output of S-R FF805 is coupled to one input of an "and" gate 819. The signal $4f_{sc(TINT)}$ signal is coupled to another input of "and" gate 819. Still another input of "and" gate 819 receives a signal which is at high logic level until counter 815 has counted to a predetermined count (910) corresponding to the end of one complete horizontal scanning interval. Accordingly, in response to the high logic level developed at the $\overline{Q}$ output of S-R FF805, "and" gate 819 is enabled to couple the signal $4f_{sc(TINT)}$ to "or" gate 809 and thereby to one-shot 811 and also to the clock (C) input of counter 815. Thus, after the 64 count corresponding to a time after the burst interval and before the beginning of the image interval, the sampling signal is derived from the signal $4f_{sc(TINT)}$ clock signal. In addition, after the 64 count, counter 815 continues to count but does so in response to the pulses of the signal $4f_{sc(TINT)}$.

When count 815 reaches a count of 910 corresponding to one complete horizontal scanning interval (since 910 times $\frac{1}{4}f_{sc}$ equals the time duration, 63.55 microseconds, of one horizontal scanning interval), a decoder 821 detects the occurrence and generates a low logic level "910" count signal. The output of decoder 821 is coupled to the D input of a D FF823. The signal $\overline{4f_{sc(TINT)}}$ is coupled to the clock (C) input of D FF823. The Q output of D FF823 is coupled to an input of "and" gate 819. In response to the first positive-going edge of the signal $\overline{4f_{sc(TINT)}}$ after the generation of the low logic level "910" count signal, a low logic level is developed at the Q output of D FF823 which disables "and" gate 819. As a result, the signal $4f_{sc(TINT)}$ is decoupled from one shot 811. In response to the positive-going trailing edge of the horizontal sync pulse corresponding to the next line, FFs 801 and 805 are again set thereby enabling "and" gate 807 and again causing the signal $4F_{sc}$ to be coupled to one-shot 811.

Figure 10:
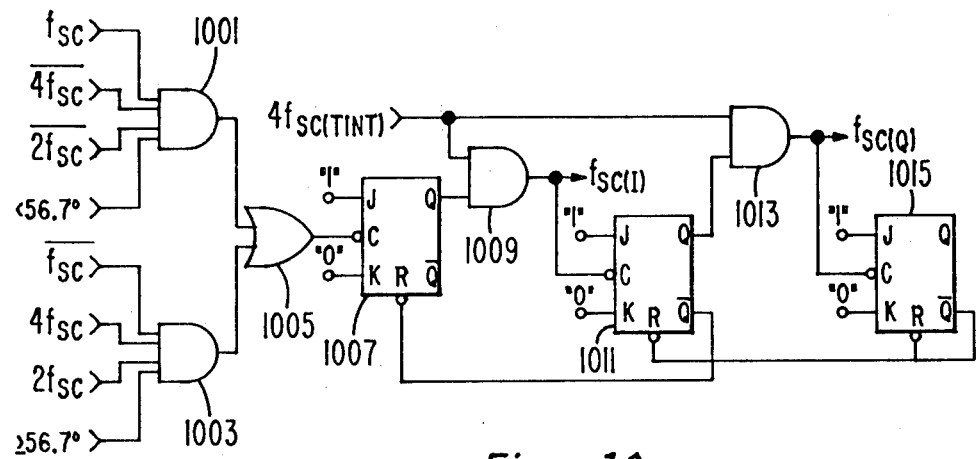
Figure 11:
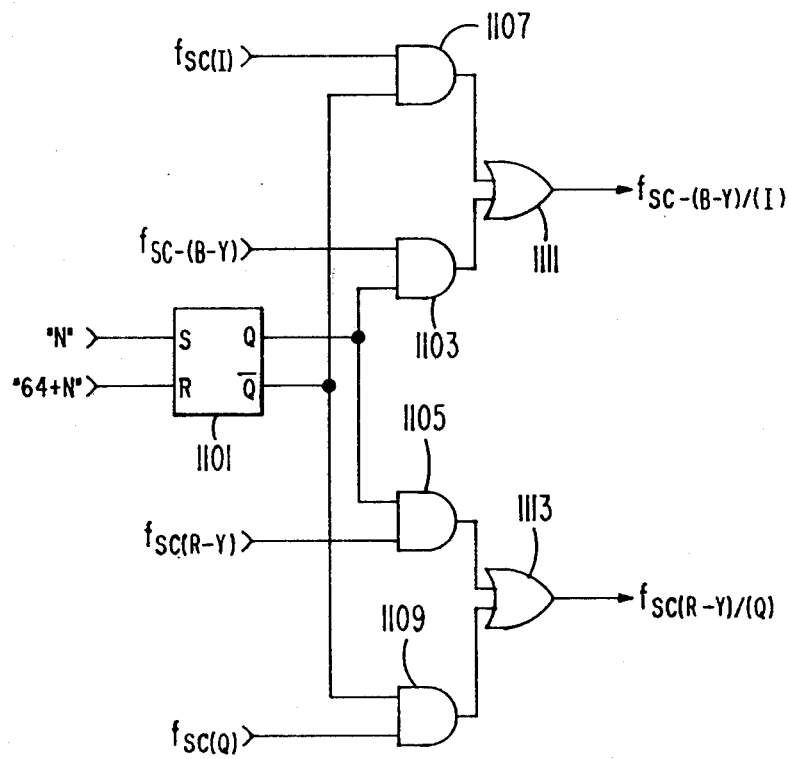

A logic implementation of burst sampler 35 is also shown in FIG. 8. Basically, it includes an accumulator 825 for adding a predetermined number of digital color samples produced by low pass filter 47 at the times corresponding to the peaks of the color burst component together to produce a digital sum which is supplied to microprocessor 31 for use in the chrominance gain control operation. To that end, the $f_{sc-(B-Y)/(I)}$ signal generated as will be described with reference to FIGS. 9, 10 and 11, is coupled to one input of an "and" gate 827. The horizontal sync signal is coupled to the clear (CLR) input of accumulator 825. In response to each horizontal sync pulse, accumulator 825 is cleared, e.g., its contents set to 0. When "and" gate 827 is enabled, the $f_{sc-(B-Y)/(I)}$ signal is applied to the latch (L) input of accumulator 825. Each pulse of the $f_{sc-(B-Y)/(I)}$ signal causes a corresonding digital color sample to be loaded into the accumulator and added to the previous sum.

The remaining structure of burst sampler 35 causes "and" gate 827 to be enabled at a count M of counter 815 corresponding to a predetermined time after the beginning of the color burst interval and causes "and" gate 827 to be disabled at a count $M+\Delta$, where $\Delta$ is a predetermined count increment, corresponding to a predetermined time before the end of the color burst interval. The counts M and $M+\Delta$ are indicated in FIG. 5c. During the interval in which "and" gate 827 is enabled, the $4f_{sc}$ sampling signal for A/D converter 3 and the $f_{sc}$ color demodulation clock signals for color demodulator 39 and digital LPF 47 will contain pulses corresponding in time to the $-(B-Y)$ color reference vector. Accordingly, the samples accumulated by accumulator 825 during that interval will correspond to the peaks of the color burst component signal. By way of example, M may be selected to correspond to the fourth burst cycle to ensure that the amplitude of the burst signal has stabilized and $\Delta$ may be selected to equal 8 so that 3 peak samples are accumulated by accumulator 825.

The structure for enabling and disabling "and" gate 827 includes a D FF829 which has its set (S) input coupled to the $\bar{Q}$ output of D FF813. As a result, D FF829 is set, causing a high logic level to be developed at its Q output, after the first positive-going edge of the signal $4f_{sc}$ following the positive-going trailing edge of the horizontal sync pulse. The Q output of D FF829 is coupled to one input of an "and" gate 831. Accordingly, "and" gate 831 is enabled by the high logic level developed at the Q output of D FF829 when it is set. A count decoder 833 is coupled to counter 815 to generate a high logic level "M" count signal at its output when counter 815 reaches a count of M. The output of decoder 833 is coupled to the other input of "and" gate 831. The output of "and" gate 831 is coupled to the set (S) input of a S-R FF835. The Q output of S-R FF835 is coupled to one input of "and" gate 827. Thus, when the high logic level "M" count signal is developed, S-R FF835 is set thereby causing a high logic level to be developed at its Q output which enables "and" gate 827.

The output of decoder 833 is coupled to the clock (C) input of S-R FF829. A low logic level ("0") is coupled to the D input of S-R FF829. Thus, S-R FF829 is reset in response to the positive-going edge of the high logic level "M" count signal when it is generated. This conditions D FF829 for the next horizontal scanning interval.

A count decoder 837 is coupled to counter 815 to generate a high level "$M+\Delta$" count signal when counter 815 reaches a count of $M+\Delta$. The output of decoder 837 is coupled to the reset (R) input of S-R FF835. Thus, when the high logic level $M+\Delta$ signal is developed at a count of $M+\Delta$, S-R FF is reset thereby causing a low logic level to be developed at its Q output which disables "and" gate 827.

The structure of FIG. 8 also includes two additional count decoders 839 and 841 coupled to outputs of counter 815. Count decoder 839 generates a high logic "N" count signal when counter 815 reaches a count of N where N is a number of counts corresponding to the time delay between the samples produced at the output of A/D converter 3 and the samples produced at the input of digital color demodulator 39. Count decoder 841 generates a high logic level "$64+N$" count signal when counter 815 reaches a count of $64+N$. The counts N and $64+N$ are indicated in FIG. 5c. The purpose of the "N" and "$64+N$" count signals will be explained with reference to FIG. 11.

The structure of FIG. 9 picks the pulses corresponding to the $-(B-Y)$ and $(R-Y)$ color reference vectors from the $4f_{sc}$ signal to produce the $f_{sc-(B-Y)}$ and $f_{sc(R-Y)}$ signals, respectively, as shown in FIG. 5b. During the description of FIG. 9, reference should be made to FIG. 5b. Since the $-(B-Y)$ pulses of the signal $4f_{sc}$ occur during the intervals in which the signals $f_{sc}$ and $2f_{sc}$ both have high logic levels, the signal $f_{sc-(B-Y)}$ is generated at the output of an "and" gate 901 which receives the signals $4f_{sc}$, $f_{sc}$ and $2f_{sc}$ at its inputs. Since the $(R-Y)$ pulses of the signal $4f_{sc}$ occur during the intervals in which the signals $\bar{f}_{sc}$ and $2f_{sc}$ both have high logic levels, the signal $f_{sc(R-Y)}$ is generated at the output of an "and" gate 903 which receives the signals $4f_{sc}$ $\bar{f}_{sc}$ and $2f_{sc}$.

The structure of FIG. 10 pick the pulses corresponding to the I and Q color reference vectors, as phased in accordance with the tint setting, from the $4f_{sc(TINT)}$ signal to produce the $f_{sc(I)}$ and $f_{sc(Q)}$ signals, respectively, as shown in FIG. 5b.

The effect of the tint adjustment is shown in FIG. 5b by the waveforms labeled "$4f_{sc(TINT)}$ at 56.7°", "$4f_{sc(TINT)} < 56.7°$", and "$4f_{sc(TINT)} \geq 56.7°$" which correspond to the nominal and extreme phase conditions the signal $4f_{sc(TINT)}$. From FIG. 5b, it is seen that for tint adjustments $<56.7°$, the I pulses of the signal $4f_{sc(TINT)}$ occur after the positive-going edges of positive-going $-(B-Y)$ pulses of the $4f_{sc}$ signal or viewed another way after the negative-going edge of the positive-going pulses labeled A of the $4f_{sc}$ signal. From FIG. 5b, it is also seen that for tint adjustments $\geq 56.7°$, the I pulses of the $f_{sc(TINT)}$ signal occur after the positive-going $-(B-Y)$ pulses of the $4f_{sc}$ signal. Accordingly, to enable the selection of the I pulses from the signal $4f_{sc(TINT)}$ after the respective A pulses of the $4f_{sc}$ signal when the tint adjustment is $<56.7°$, an "and" gate 1001 is responsive the signals $\bar{f}_{sc}$, $4\bar{f}_{sc}$ and $2\bar{f}_{sc}$ coupled to its inputs to produce pulses at its output corresponding in time to the A pulses of the signal $4f_{sc}$ when enabled by the high logic level "$<56.7°$" signal. In similar fashion, to enable the selection of the I pulses from the signal $4f_{sc(TINT)}$ signal after respective $-(B-Y)$ pulses of the $4f_{sc}$ signal when the tint adjustment is $\geq 56.7°$, an "and" gate 1003 is responsive to the signals $f_{sc}$, $4f_{sc}$ and $2f_{sc}$ coupled to its inputs to produce pulses at its output corresponding in time to the $-(B-Y)$ pulses of the $4f_{sc}$ signal when enabled by the high logic level "$\geq 56.7°$" signal. The pulses produced at the output of the enabled one of "and" gates 1001 and 1003 is coupled through an "or" gate 1005 to the clock (C) input of a J-K 1007. For purposes of describing the operation of the logic arrangement of FIG. 10, it will be assumed that the tint adjustment is $<56.7°$ so that "and" gate 1001 is enabled and "and" gate 1003 is disabled.

A high logic level ("1") is coupled to the J-input of J-K FF 1007 and a low logic level ("0") is coupled to the K input of J-K FF1007. The Q output of J-K FF 1007 is coupled to one input of an "and" gate 1009 and the signal $4f_{sc(TINT)}$ is coupled to the other input of "and" gate 1009. In response to the negative-going edges of the pulses applied to its clock input from "or" gate 1005, J-K FF 1007 is set causing a high logic level to be developed at its Q output which enables and gate 1009. The $f_{sc(I)}$ signal is produced at the output of "and" gate 1009 since it is enabled during at the time intervals following the A pulses of the $4f_{sc}$ signal when the I pulses of the $4f_{sc(TINT)}$ signal occur.

The output of "and" gate 1009 is coupled to the clock (C) input of a J-K FF 1011. A high logic level ("1") is coupled to the J input of J-K FF 1011 and a low logic level is coupled to its K input. The Q output of J-K FF 1011 is coupled to one input of an "and" gate 1013. The signal $4f_{sc(TINT)}$ is coupled to the other input of "and" gate 1013. The $\overline{Q}$ output of J-K FF 1011 is coupled to the reset (R) input of J-K FF 1007. In response to the negative-going trailing edges of the I pulses of the signal $f_{sc(I)}$ produced at the output of "and" gate 1009, J-K 1011 is set causing a high logic level to be developed at its Q output which enables "and" gate 1013. The $f_{sc(Q)}$ is produced at the output of "and" gate 1013 since it is enabled during the time intervals following the I pulses of the signal $4f_{sc(TINT)}$ when the Q pulses occur. In response the low logic levels developed at the $\overline{Q}$ output of J-K FF 1011 at the times when it is set in response to the negative-going trailing edges of the signal $f_{sc(I)}$, J-K FF 1007 is reset causing corresponding low logic levels to be developed at its Q output. Those low logics level disable "and" gate 1009 thereby preventing pulses other than the I pulses of the $4f_{sc(TINT)}$ from being developed at its output.

The output of "and" gate 1013 is coupled to the clock (C) input of another J-K 1015 which has a high logic level ("1") coupled to its J input and a low logic level ("0") coupled to its K input. The $\overline{Q}$ output of J-K FF 1015 is coupled to its own reset (R) input and to the reset input of J-K FF 1011. In response to the negative-going trailing edges of the Q pulses of the signal $f_{sc(Q)}$ produced at the output of "and" gate 1013, J-K 1011 is reset causing negative-going edges to the produced at its $\overline{Q}$ output which reset both of J-K FFs 1011 and 1115. Whenever J-K 1011 is reset, a low logic level is developed at its Q output and "and" gate 1013 is disabled.

The operation of the structure of FIG. 10 for tint adjustments $\geq 56.7°$ is similar to that for tint adjustments <56.7 except that as earlier indicated "and" gate 1003 is enabled rather than "and" gate 1001.

The structure shown in FIG. 11 selectively applies the $f_{sc-(B-Y)}$ and $f_{sc(R-Y)}$ signals to demodulator 39, low pass filters 47 and 49, and D/A converters 51 and 53 during the interval of each horizontal line between the N and 64+N counts of counter 815 in order to sample the peaks of the color burst signal and applies the $f_{sc(I)}$ and $f_{sc(Q)}$ signals to demodulator 39, low pass filters 47 and 49 and D/A converters 51 and 53 during the interval of the horizontal line between the 64+N and 910 counts of counter 815 in order to demodulate the digital color samples with respect to the I and Q color reference vectors as modified by the tint adjustment. The times at which the phases of the color demodulation clock signals are switched is delayed from the times corresponding to counts of 0 and 64 to times corresponding to N and 64+N, respectively, to account for the time delay between the samples produced at the output of A/D converter 3 and low pass filter 47. The relationship between the various counts is shown in FIG. 5c. The delay corresponding to N allows sufficient time to pass so that the samples produced at the output of low pass filter 47 during the burst sampling interval correspond to the peaks of the color burst signal rather than the samples taken at times corresponding to the tint adjusted I and Q color reference vectors and so that the samples produced at the output of low pass filters 47 and 49 during the image interval corresponding to the tint adjusted I and Q color reference vectors rather than the −(B-Y) and (R-Y) color reference vectors.

The structure of FIG. 11 includes an S-R FF 1101 which receives the "N" count signal at its S input and the "64+N" count signal at its reset input. The Q output of S-R FF 1101 is applied to first inputs of "and" gates 1103 and 1105, respectively. The $f_{sc-(B-Y)}$ and $f_{sc(R-Y)}$ signals are applied to second inputs of "and" gates 1103 and 1105, respectively. The $\overline{Q}$ output of S-R FF 1101 is coupled to first inputs of "and" gates 1107 and 1109, respectively. The $f_{sc(I)}$ and $f_{sc(Q)}$ signals are applied to second inputs of and gates 1107 and 1109, respectively. The outputs of "and" gates 1103 and 1107 are coupled to respective inputs of an "or" gate 1111. The $f_{sc-(B-Y)/(I)}$ signal is developed at the output of "or" gate 1111. The outputs of "and" gates 1105 and 1109 are coupled to respective inputs of an "or" gate 1113. The $f_{sc(R-Y)/(Q)}$ signal is developed at the output of "or" gate 1113.

When counter 815 reaches a count of N, the high logic level "N" count signal is generated and S-R FF 1101 is set causing a high logic level to be developed at its Q output and a low logic level to be developed at its $\overline{Q}$ output. That low logic level disables "and" gates 1107 and 1109. As a result, the pulses of the $f_{sc(B-Y)}$ and $f_{sc(R-Y)}$ signals are coupled to the inputs of "or" gates 1111 and 1113, respectively. When counter 813 reaches a count of 64+N, the high logic level "64+N" count signal is generated and S-R FF 1101 is reset causing a low logic level signal to be developed at its Q output and a high logic level to be developed at its $\overline{Q}$ output. As a result, "and" gates 1103 and 1105 are disabled and "and" gates 1107 and 1109 are enabled. Accordingly, the pulses of the $f_{sc(I)}$ and $f_{sc(Q)}$ signals are coupled to the outputs of "or" gates 1111 and 1113, respectively.

In the specific embodiment described, the $4f_{sc}$ sampling signal and the $f_{sc}$ color demodulation clock signals are caused to have pulses corresponding to the −(R-Y) and (R-Y) color reference vectors during the non-image interval comprising a portion of the retrace interval of each horizontal scan line and pulses corresponding to the I and Q color reference vectors during the image interval of each horizontal scan line. However, other non-image intervals such as a portion of the vertical retrace interval, e.g., during which the first ten lines of a field occur, may be employed.

In addition, while digital burst sampler 35 is coupled to the output of digital LPF 47, it could also be coupled to other locations within the chrominance channel. For example, digital burst sampler 35 could be coupled at the output of digital chrominance BPF 37 so that (B-Y), −(R-Y) and −(B-Y) as well as (R-Y) samples are available for evaluation. Such an arrangement is useful since it enables a peak to peak amplitude measurement to be made by selecting and taking the difference of the −(B-Y) and (B-Y) samples. It is also useful since it enables the selection of the (R-Y) and −(R-Y) samples.

Since in the absence of phase shift, the (R-Y) and −(R-Y) samples correspond to the zero crossover points of the color burst signal component, the (R-Y) and −(R-Y) samples may be employed to derive a control signal for correcting any phase shift. It will be appreciated that in order to select samples other than the −(B-Y) samples, the clock signal applied to digital burst sampler 35 must be modified to include pulses from the signal $4f_{sc}$ corresponding to the desired samples. This is simply accomplished by "and" gates similar to "and" gates 901 and 903 shown in FIG. 9.

These and other modifications are contemplated to be within the scope of the invention defined by the following claims.

What is claimed is:

1. A digital television signal processing apparatus, comprising:
   a source of a composite analog television signal representing luminance and chrominance information of an image including image and non-image intervals, said non-image intervals including a color burst interval in which a color burst signal component occurs;
   sampling signal generating means responsive to said analog television signal for generating a sampling signal including a series of pulses and for selectively causing said sampling signal to have a first phase condition fixed relative to the phase of said color burst signal component during a first interval within said non-image interval which includes at least a portion of said color burst interval and causing said sampling signal to have a second phase condition adjustable substantially throughout a predetermined range relative to the phase of said color burst signal component during a second interval including said image interval;
   analog to digital converting means responsive to said analog television signal and to said sampling signal for generating digital samples representing said analog television signal at times corresponding to the pulses of said sampling signal;
   color burst sampling means responsive to said digital television signal samples and to said sampling signal for selecting particular ones of said digital television signal samples corresponding to respective pulses of said sampling signal occurring during said first interval in order to evaluate the amplitude of said selected digital television samples; and
   color demodulating means responsive to said digital television signal samples and to said sampling signal for selecting particular ones of said digital television signal samples corresponding to respective pulses of said sampling signal occurring during said second interval in order to produce digital samples representing the tint of said image.

2. The apparatus recited in claim 1 wherein:
   said sampling signal generating means includes first phase control means responsive to said color burst signal component for generating a first sampling signal which has a frequency which is an integer multiple of the frequency of said color burst signal which has a first phase with respect to said color burst signal component corresponding to a first phase point of said color burst signal component; second phase control means responsive to said first sampling signal for generating a second sampling signal which has a second phase adjustable substantially throughout said predetermined range with respect to a second phase point of said color burst signal component; and sampling signal switching means for generating said sampling signal by selecting said first sampling signal during said first interval and by selecting said second sampling signal during said second interval.

3. The apparatus recited in claim 2 wherein:
   said first phase point corresponds to a first color reference vector; and
   said second phase point corresponds to a second color reference vector.

4. The apparatus recited in claim 3 further including:
   first clock signal generating means responsive to said first sampling signal for selecting pulses from it to generate a first clock signal;
   second clock signal generating means responsive to said second sampling signal for selecting pulses from it to generate a second clock signal;
   third clock signal generating means responsive to said second sampling signal for selecting pulses from it which are spaced from respective ones of said pulses selected from said second sampling signal by a time interval corresponding to a ninety degree phase interval of said color burst signal component to generate said second clock signal;
   separation means responsive to said digital samples produced by said analog to digital converting means for producing separate digital luminance and chrominance samples representing said luminance and chrominance information, respectively, contained in said analog television signal;
   first clock signal switching means for selectively coupling said first clock signal to said color burst sampling means during said first interval;
   said color burst sampling means being responsive to said digital chrominance samples and to said first clock signal for selecting ones of said digital chrominance samples corresponding to pulses of said first clock signal to produce digital samples representing the amplitude of said color burst signal component;
   second clock signal switching means for selectively coupling said second clock signal to a second color demodulating means included in said color demodulating means during said second interval; and
   third color signal switching means for selectively coupling said third clock signal to a second color demodulating means included in said color demodulating means during said second time interval;
   said first color demodulating means being responsive to said digital chrominance samples and to said second clock signal for selecting ones of said digital chrominance samples correspondingg to pulses of said second clock signal to produce first digital color samples representing a first type of color information contained in said analog television signal;
   said second color demodulating means being responsive to said digital chrominance samples and to said third clock signals for selecting ones of said digital chrominance samples corresponding to pulses of said third clock signal to produce second digital color samples representing a second type of color information contained in said analog television signal.

5. The apparatus recited in claim 4 wherein:

said first phase point corresponds to one of the −(B-Y), (R-Y), (B-Y) and −(R-Y) color reference vectors; and said second phase point corresponds to one of the I, Q, −I and −Q color reference vectors.

6. The apparatus recited in claim 5 wherein:

said first and second switch means cooperate to selectively couple said first clock signal to said first color demodulation means during said first time interval and to selectively couple said second clock signal to said second color demodulating means during said second time interval;

said first color demodulating means selecting digital color samples corresponding to said pulses of said first clock signal to generate said first digital samples during said first time interval and selecting digital color samples corresponding to said pulses of said second clock signal to generate said first digital samples during said second time interval; and said color burst sampling means is responsive to said first digital color samples.

7. The apparatus recited in claim 2 wherein:

said non-image and image intervals occur in sequence in a horizontal scanning intervals in sequence between successive horizontal synchronizing pulses; and said sampling signal switching means selectively couples one of said first and second sampling signals to a circuit point in order to develop said sampling signal and includes sampling signal switching control means for causing said sampling signal switching means to couple said first sampling signal to said circuit point after the occurrence each of said horizontal synchronizing pulses during said non-image interval, for causing said sampling signal switching means to couple said second sampling signal to said circuit point at a first predetermined time before said image interval and for causing said sampling switching control means decouple said second sampling signal from said circuit point at a second predetermined time corresponding to the end of said horizontal scanning interval.

8. The apparatus recited in claim 7 wherein:

said sampling signal switching control means includes counting means for counting pulses coupled to an input thereof, said input being coupled to said circuit point; first detecting means for detecting the occurrence of a first count corresponding to said first time; second count detecting means for detecting the occurrence of a second count corresponding to said second count; said sampling signal switching means being coupled to said first and second count detecting means, being responsive to the detection of said first count for coupling said second sampling signal to said circuit point and being responsive to the detection of said second count for decoupling said second sampling signal from said circuit point.

9. The apparatus recited in claim 4 further including:

a number of cascaded stages, each responsive to said sampling signal, for delaying said digital samples produced by said analog to digital converting means to produce delayed digital samples delayed in time from respective undelayed samples by a multiple of said horizontal scanning interval;

combining means for combining said delayed and undelayed digital samples to produce digital samples representing at least one of the luminance and chrominance information contained in said analog television signal; and wherein said second predetermined count equals the number of said stages.

10. The apparatus recited in claim 1 wherein:

said sampling signal has a frequency substantially equal to four times the frequency of said color burst signal component.

11. A digital television signal processing apparatus, comprising:

a source of a composite analog television signal representing luminance and chrominance information and including image and non-image intervals occurring in sequence in a horizontal scanning interval between successive horizontal synchronization pulses, said non-image intervals including a color burst interval in which a color burst signal component occurs;

first sampling signal generating means for generating a first sampling signal including a series of pulses and having a first phase condition fixed relative to the phase of said color burst signal component;

second sampling signal generating means including a series of pulses and having a second phase condition adjustable substantially throughout a predetermined range relative to the phase of said color burst signal component;

sampling signal switching means responsive to said first and second sampling signals for generating a switched phase sampling signal by selecting said first sampling signal during a first time interval within said non-image interval and which includes at least a portion of said color burst interval and by selecting said second sampling interval during a second time interval which includes at least said image interval;

analog to digital converting means responsive to said analog television signal and to said switched phased sampling signal for generating digital samples representing said analog television signal at times corresponding to the pulses of said switched phase sampling signal;

digital comb filtering means responsive to said digital samples and said switched phase sampling signal for deriving separated digital samples representing said luminance and chrominance information;

first clock signal generating means responsive to said first sampling signal for selecting pulses therefrom to derive a first clock signal;

second clock signal generating means responsive to said second sampling signal for selecting pulses therefrom to derive a second clock signal;

third clock signal generating means responsive to said second sampling signal for selecting pulses therefrom different from the pulses selected by said second clock signal generating means to derive said second clock signal to derive a third clock signal;

burst sampling means responsive to said digital chrominance samples and to said first clock signals for deriving digital chrominance sample corresponding in time to the pulses of said first clock signal; and color demodulating means responsive to said digital chrominance samples and to said second and third clock signal for deriving separated digital chrominance samples corresponding in time to the pulses of said second and third clock signal.

* * * * *

UNITED STATES PATENT AND TRADEMARK OFFICE
CERTIFICATE OF CORRECTION

PATENT NO. : 4,463,371
DATED : July 31, 1984
INVENTOR(S) : Henry Garton Lewis, Jr.

It is certified that error appears in the above-identified patent and that said Letters Patent is hereby corrected as shown below:

Column 5, line 7, "beam" should be --beams--.

Column 6, line 22, "colors" should be --color--.

Column 8, line 29, "storage" should be --stage--.

Column 12, line 35, "section" should be --selection--.

Column 13, line 21, "corresponds" should be --correspond--.

Column 20, line 55, "correspondingg" should be --corresponding--.

Signed and Sealed this

Thirteenth Day of August 1985

[SEAL]

Attest:

DONALD J. QUIGG

Attesting Officer     Acting Commissioner of Patents and Trademarks